United States Patent
Hanson et al.

(10) Patent No.: US 8,111,636 B2
(45) Date of Patent: Feb. 7, 2012

(54) METHOD AND APPARATUS FOR PROVIDING SPONTANEOUS MULTI-WAY TELEPHONE CONVERSATION WITH INSERTED MESSAGING

(75) Inventors: Karrie Hanson, Westfield, NJ (US); Gerald Karam, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/647,483

(22) Filed: Dec. 26, 2009

(65) Prior Publication Data
US 2010/0097961 A1   Apr. 22, 2010

Related U.S. Application Data

(63) Continuation of application No. 11/049,530, filed on Feb. 2, 2005, now Pat. No. 7,664,058.

(51) Int. Cl.
*H04L 12/16* (2006.01)
(52) U.S. Cl. .................... 370/260; 379/202.01
(58) Field of Classification Search ................ None
See application file for complete search history.

(56) References Cited

U.S. PATENT DOCUMENTS

| | | | |
|---|---|---|---|
| 5,778,053 A * | 7/1998 | Skarbo et al. | 379/93.21 |
| 6,011,782 A | 1/2000 | DeSimone et al. | |
| 6,028,922 A * | 2/2000 | Deutsch et al. | 379/211.02 |
| 6,363,411 B1 * | 3/2002 | Dugan et al. | 709/202 |
| 6,628,767 B1 * | 9/2003 | Wellner et al. | 379/202.01 |
| 6,674,459 B2 * | 1/2004 | Ben-Shachar et al. | 348/14.09 |
| 6,873,627 B1 | 3/2005 | Miller et al. | |
| 6,996,414 B2 | 2/2006 | Vishwanathan et al. | |
| 7,277,697 B2 | 10/2007 | Desai et al. | |
| 7,330,540 B2 | 2/2008 | Darby et al. | |
| 7,418,090 B2 * | 8/2008 | Reding et al. | 379/202.01 |
| 7,664,058 B1 | 2/2010 | Hanson et al. | |
| 7,804,948 B2 * | 9/2010 | Turner | 379/204.01 |
| 2003/0108002 A1 | 6/2003 | Chaney et al. | |
| 2003/0118167 A1 | 6/2003 | Sammon et al. | |
| 2005/0058125 A1 | 3/2005 | Mutikainen et al. | |
| 2005/0074107 A1 * | 4/2005 | Renner et al. | 379/202.01 |
| 2005/0101303 A1 * | 5/2005 | Pelaez et al. | 455/413 |
| 2005/0281208 A1 | 12/2005 | Dorenbosch et al. | |
| 2006/0041688 A1 | 2/2006 | Wright et al. | |
| 2006/0088152 A1 | 4/2006 | Green et al. | |
| 2006/0250987 A1 * | 11/2006 | White et al. | 370/260 |
| 2007/0064898 A1 * | 3/2007 | Amano et al. | 379/168 |
| 2009/0097627 A9 * | 4/2009 | Liljestrand et al. | 379/201.03 |

* cited by examiner

*Primary Examiner* — Phirin Sam

(57) ABSTRACT

The present invention provides a method for simultaneously broadcasting a message to a plurality of end-point devices. More specifically, the present invention receives a request to initiate a teleconference from a subscriber. The plurality of end-point devices is then invited to join the teleconference.

20 Claims, 4 Drawing Sheets

METHOD AND APPARATUS FOR PROVIDING SPONTANEOUS MULTI-WAY TELEPHONE CONVERSATION WITH INSERTED MESSAGING

This application is a continuation of U.S. patent application Ser. No. 11/049,530, filed Feb. 2, 2005, now U.S. Pat. No. 7,664,058, and is herein incorporated by reference in its entirety.

The present invention relates generally to communication networks and, more particularly, to an apparatus and method for simultaneously broadcasting a message to a plurality of endpoint devices.

BACKGROUND OF THE INVENTION

In some situations it may be necessary for a person to speak with a number of people at once at the spur of the moment. For example, a parent may wish to call all their teenage children at the end of the school day to arrange the rest of the afternoon. Or a person may wish to call a group of friends to plan an outing. Also, a member of a work group may wish to call a group of experts to solve an urgent problem. People are now frequently faced with problems that require the input of multiple people to find an optimal solution. With the ubiquitous presence of cell phones, this kind of "spontaneous meeting" is possible. Indeed, because cell phones are most often associated with a single person's address, rather than a residential or group address, services can now be offered based on the assumption that the recipient of the call is the person who answered the telephone.

This kind of need is normally solved by conference calls, and in particular reservationless conference calls. However, conventional conference calls require the use of bridge resources and only support conferencing, not messaging and automatic reconnection of participants.

Therefore, a need exists for a method and apparatus for providing simultaneous broadcasting of a message to a plurality of endpoint devices.

SUMMARY OF THE INVENTION

In one embodiment, the present invention provides a method for simultaneously broadcasting a message to a plurality of end-point devices. More specifically, the present invention receives a request to initiate a teleconference from a subscriber. The plurality of end-point devices is then invited to join the teleconference.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
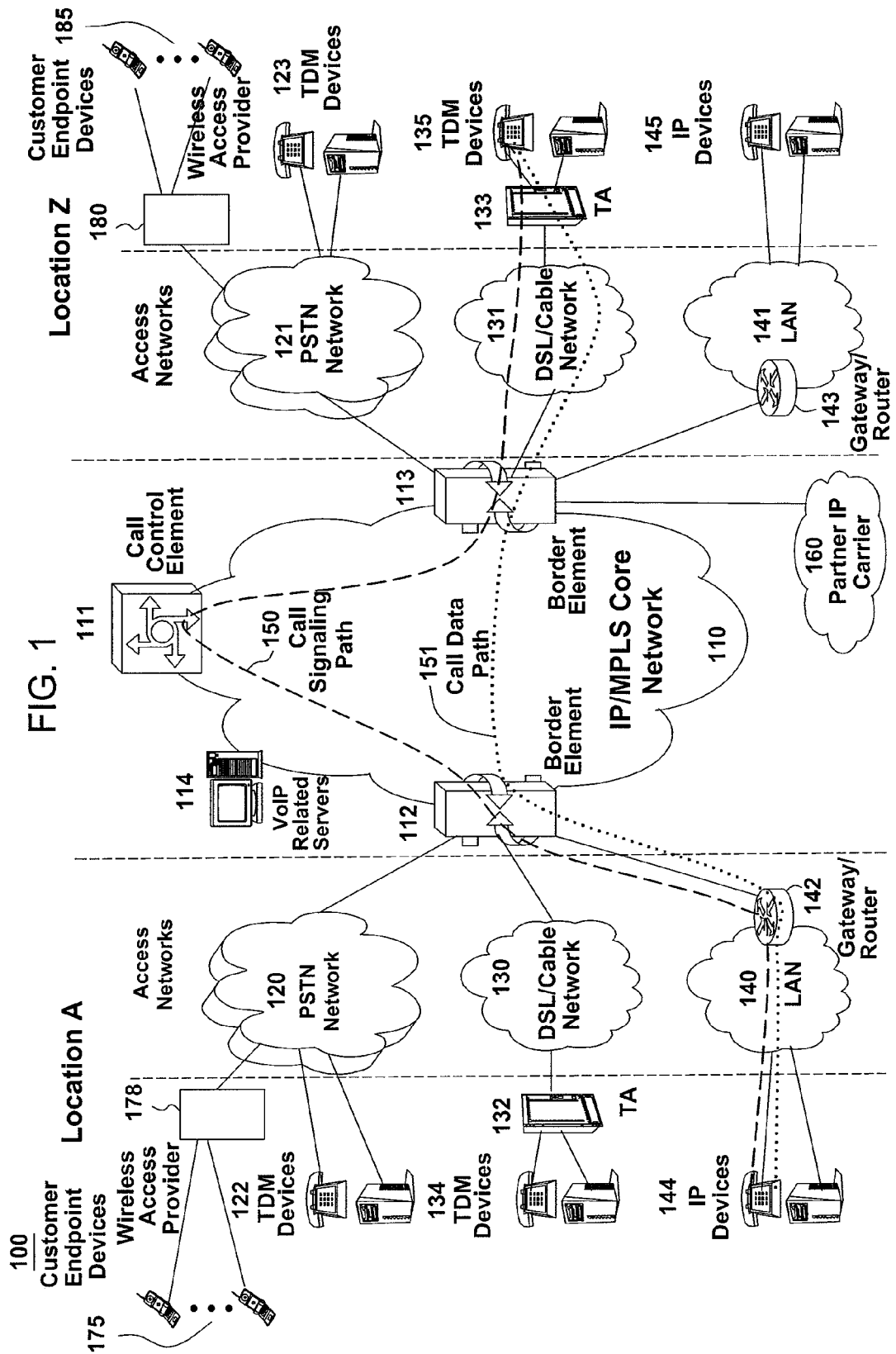
FIG. 1 illustrates a Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

A wireless access provider 170, 180 is used to provide access for wireless endpoint devices 175, 185. Although FIG. 1 shows that the wireless access provider 170, 180 is connected to the PSTN it is possible for a wireless endpoint device 175, 185 to be provided access to border element 112, 113 via one of the other networks 130, 131, 140, 141 or via a separate wireless network (not shown).

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Although the present invention is described in the context of SIP, It should be understood that the present invention can be employed in any signaling protocols. Furthermore, the present invention can be employed in signaling protocols that are compliant to various signaling standards or their variants.

In some situations it may be necessary for a person to speak with a number of people at once at the spur of the moment. This kind of need is normally solved by conference calls, and in particular reservationless conference calls. However, conventional conference calls require the use of bridge resources and only support conferencing, not messaging and automatic reconnection of participants. The present invention provides simultaneous broadcasting of a message to a plurality of endpoint devices.

Figure 2:
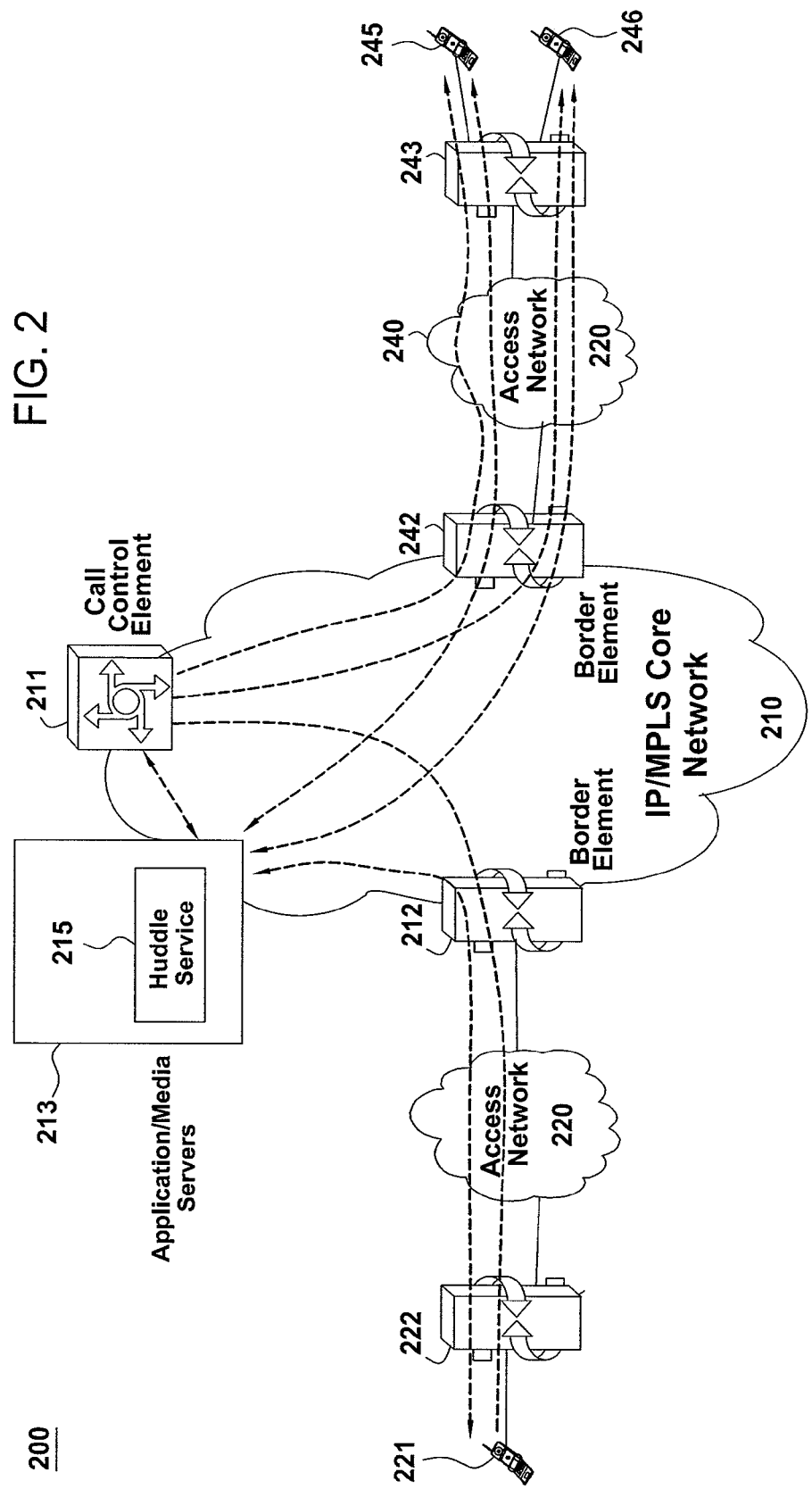
FIG. 2 illustrates an example of a sequence of events related to signal processing by the core VoIP network of the present invention.

FIG. 2 illustrates an example of a sequence of events related to signal processing by the core VoIP network of the present invention. Subscriber 221 (i.e., the wireless endpoint device) invokes the service (e.g., Huddle Service 215) via wireless access provider 222 and/or access network 220 to border element 212. The service may be invoked by dialing an access number for the Huddle Service or by accessing the internet using wireless endpoint device 221. The border element 212 routes the service request to call control element 211. Call control element 211 contacts the application/media server 213 to respond to the service request. The Huddle Service 215 is then set up by application/media server 213. The subscriber (the individual initiating the service) must establish in the service a "group" of recipients (including telephone numbers) that, including the subscriber, will form the spontaneous multi-way telephone conversations with inserted messaging (a "Gathering" or "Huddle"). The subscriber then records a short voice message for the recipients, indicating an invitation to the conference gathering. (The subscriber calling into the service, for example can handle this task). At this point the Huddle service 215 places a phone call using call control element 211 to each recipient 245, 246 in the group at the telephone number specified. The call directed to the recipients 245, 246 is handled by border element 242 and is routed through access network 240 and wireless access provider 243. When recipients 245, 246 answer the message recorded by the subscriber message is played. If the recipients join the Huddle, they are connected using an audio conferencing bridge provided by application/media server 213.

In one embodiment, the Huddle service may be launched over the internet. In this embodiment, the call is initiated via the internet. A subscriber is able to monitor and interact with the Huddle service via the internet. A record of the Huddle is maintained on a website. Thus, a subscriber would be able to monitor who is joining the huddle by viewing the website. A subscriber would also be able to ascertain when messages are received by the Huddle service on the web. Received messages may be listened to by the subscriber via the web as well. When the Huddle is over, the subscriber has a record of any messages that were delivered on the Huddle and who actually participated.

Figure 3:
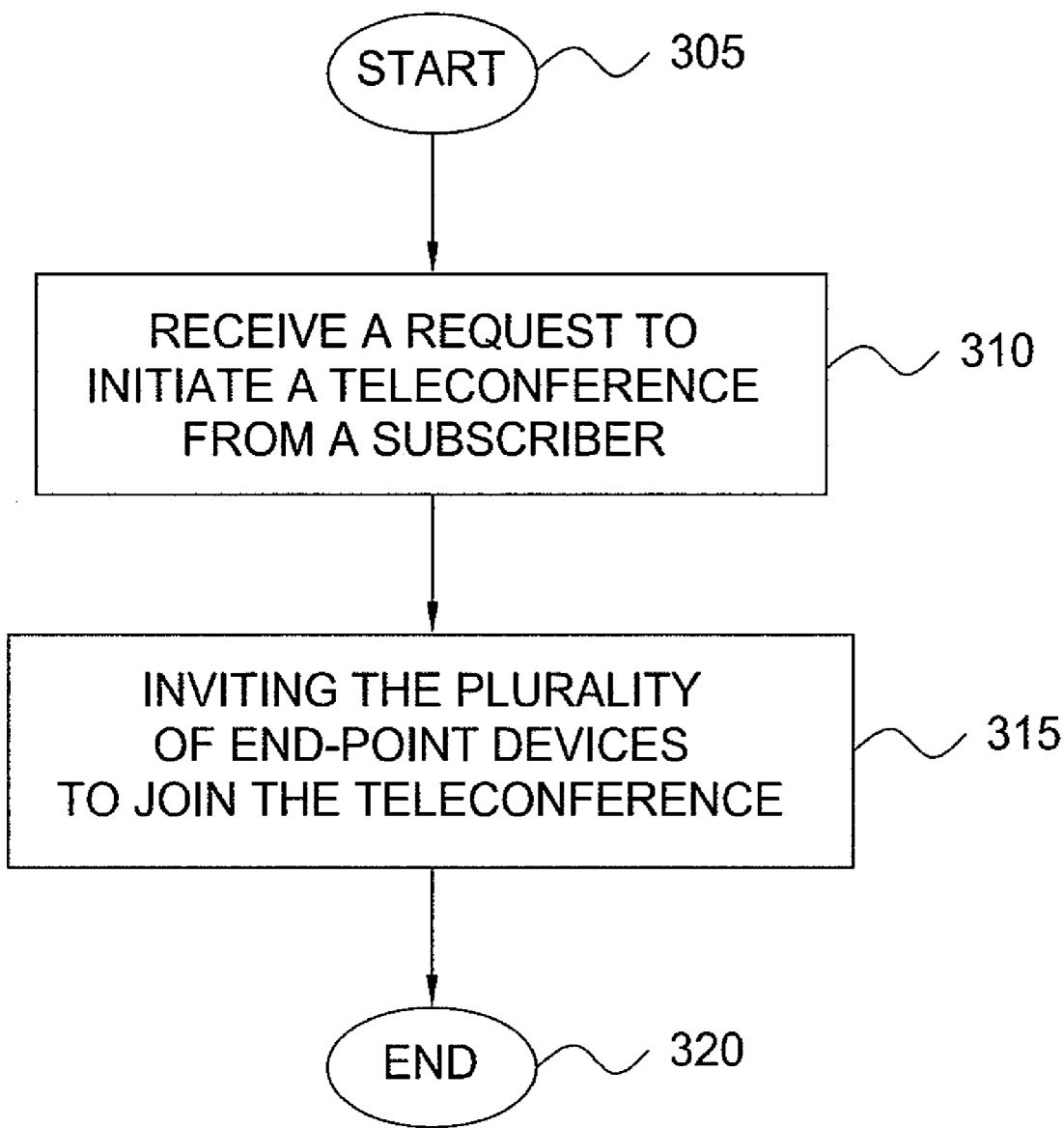
FIG. 3 illustrates a flowchart of a method for providing multiple conference calls from a single conference call of the present invention.

FIG. 3 illustrates a flowchart of a method 300 in accordance with the present invention. Method 300 starts in step 305 and proceeds to step 310.

In step 310, a request to initiate a teleconference is received. Prior to initiating a request for a teleconference a subscriber establishes at least one group of attendees to be invited to a gathering. Each group has a group name, and each group comprises the name, telephone number and, optionally, the email address for each member of the group. The group may either be stored in the endpoint device or in application/media server 213. The subscriber initiates a "Gathering" or "Huddle" feature. Once the Huddle feature is initiated, the subscriber records a greeting for the huddle.

In step 315, the plurality of end-point devices is invited to join the teleconference. The Huddle service places a phone call via CCE 211 and pertinent BES to huddle attendees. When an attendee answers their phone, they hear the greeting recorded by the subscriber who initiated the huddle followed by the Gathering or Huddle menu. In one embodiment, the attendee hears an invitation generated by the Huddle Service. The Huddle service allows an attendee to join the huddle, send a reply, or decline the invitation to the huddle.

If the attendee opts to "join", the attendee is connected with the subscriber. If there is only one attendee to the huddle, the call is treated as a person-to-person call. If more than one attendee elects to join, then the call becomes a conference call (e.g., the Huddle service sets up a conference bridge).

In one embodiment, when only one attendee has joined the huddle and a point-to-point call has been established, a subsequent attendee may elect to join the huddle. In this embodiment, application server 213 detects that greater than two people need to join the huddle. Then the application server 213 sets up a conference bridge. Call control element 211 causes the pertinent border elements to connect a media path of the attendees to the conference bridge.

If the attendee opts to "reply", the attendee records a reply, sends the reply, and then hangs up. If there are no attendees on the call, the reply message is played to the subscriber. If there are one or more attendees on the call, the reply is played to all who are present on the call. The gathering is over when the subscriber indicates an "end" to the gathering.

If any attendees fail to answer their phone when invited by the Huddle feature, the attendees will see a call from the subscriber's service phone number. In one embodiment, a message may be left on the voice mail system of the attendee by the Huddle service. This message includes a return phone number for the gathering. If the attendee returns the call to the subscriber's service number while the gathering is still active, the attendee will hear the greeting and the Huddle menu. If the Huddle is over, the call is forwarded to the subscriber.

If the subscriber chooses to end the Huddle, the subscriber has the option of sending a message to all the members of the group who did not attend. This is done by recording a voice message and having it delivered to the attendees. The message could be delivered to either voice mail or email systems. The subscriber can end a call and without terminating the gathering, in which case if a recipient attempts to contact the gathering, a call to the subscriber is re-established.

The present invention is more flexible than a dynamic conference call or even 3-way style calling since it does not require knowledge of recipients of a conference bridge, or a requirement of the subscriber to place calls to all recipients and coordinate with them. Indeed a conference bridge may not be needed at all depending on the order in which participants join the gathering. The present invention produces more convenient results for end users and more efficient resource usage for service providers.

Figure 4:
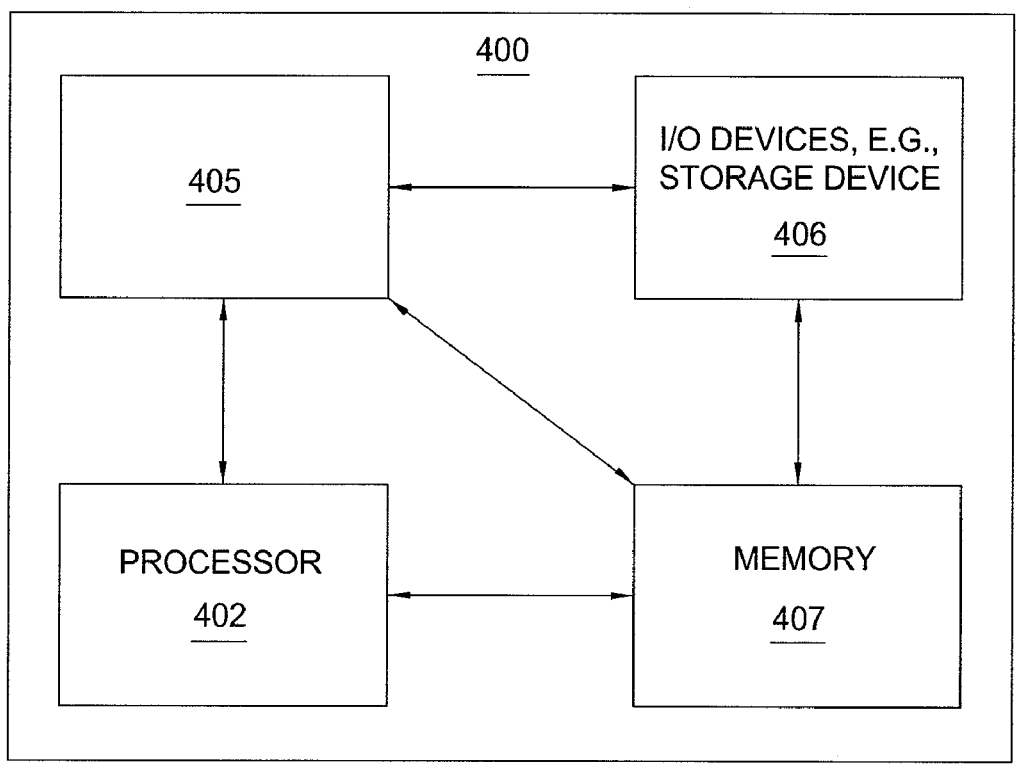
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a huddle module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the huddle module 405 can be loaded into memory 404 and executed by processor 402 to implement the functions as discussed above. As such, huddle module 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for simultaneously broadcasting a message to a plurality of endpoint devices, comprising:
receiving a request to initiate a teleconference from a subscriber; and
inviting the plurality of endpoint devices to join the teleconference by simultaneously placing a telephone call containing a message recorded by the subscriber to each of the plurality of endpoint devices.

2. The method of claim 1, wherein the inviting further comprises providing a plurality of options to a user of one of the endpoint devices.

3. The method of claim 2, wherein one of the options allows the user to immediately join the conference.

4. The method of claim 1, wherein a conference bridge is established when more than one of the endpoint devices elects to join the teleconference.

5. The method of claim 1, wherein the inviting further comprises leaving a message on a voice mail system of one of the endpoint devices when a user of the endpoint device fails to answer the telephone call.

6. The method of claim 1, wherein when only one of the endpoint devices elects to join the teleconference a point-to-point call is established between the subscriber and the endpoint device.

7. The method of claim 1, wherein the request is a recorded audio message.

8. An apparatus for simultaneously broadcasting a message to a plurality of endpoint devices, comprising:
a processor configured to:
receive a request to initiate a teleconference from a subscriber; and
invite the plurality of endpoint devices to join the teleconference by simultaneously placing a telephone call containing a message recorded by the subscriber to each of the plurality of endpoint devices.

9. The apparatus of claim 8, wherein the processor is further configured to invite the plurality of endpoint devices to join the teleconference by providing a plurality of options to a user of one of the endpoint devices.

10. The apparatus of claim 9, wherein one of the options allows the user to immediately join the conference.

11. The apparatus of claim 8, wherein the processor is further configured to establish a conference bridge when more than one of the endpoint devices elects to join the teleconference.

12. The apparatus of claim 8, wherein the processor is further configured to invite the plurality of endpoint devices to join the teleconference by leaving a message on a voice mail system of one of the endpoint devices when a user of the endpoint device fails to answer the telephone call.

13. The apparatus of claim 8, wherein when only one of the endpoint devices elects to join the teleconference a point-to-point call is established between the subscriber and the endpoint device.

14. A non-transitory computer-readable medium having stored thereon a plurality of instructions, the plurality of instructions including instructions which, when executed by a processor, cause the processor to perform a method for simultaneously broadcasting a message to a plurality of endpoint devices, comprising:

receiving a request to initiate a teleconference from a subscriber; and inviting the plurality of endpoint devices to join the teleconference by simultaneously placing a telephone call containing a message recorded by the subscriber to each of the plurality of endpoint devices.

15. The non-transitory computer-readable medium of claim 14, wherein the inviting further comprises providing a plurality of options to a user of one of the endpoint devices.

16. The non-transitory computer-readable medium of claim 15, wherein one of the options allows the user to immediately join the conference.

17. The non-transitory computer-readable medium of claim 14, wherein a conference bridge is established when more than one of the endpoint devices elects to join the teleconference.

18. The non-transitory computer-readable medium of claim 14, wherein the inviting further comprises leaving a message on a voice mail system of one of the endpoint devices when a user of the endpoint device fails to answer the telephone call.

19. The non-transitory computer-readable medium of claim 14, wherein when only one of the endpoint devices elects to join the teleconference a point-to-point call is established between the subscriber and the endpoint device.

20. The non-transitory computer-readable medium of claim 14, wherein the request is a recorded audio message.

* * * * *